(12) United States Patent
Cho et al.

(10) Patent No.: US 9,718,911 B2
(45) Date of Patent: *Aug. 1, 2017

(54) END-MODIFIED CONJUGATED DIENE POLYMER AND METHOD FOR PREPARING THE SAME

(71) Applicant: Korea Kumho Petrochemical Co., Ltd., Seoul (KR)

(72) Inventors: Hanjoung Cho, Daejeon (KR); Jae Young Ko, Daejeon (KR); Min Sung Kwon, Daejeon (KR); Dae Hyung Lee, Daejeon (KR); Eun Kyung Noh, Daejeon (KR); Cheol Min Park, Daejeon (KR); Sang Chul Ji, Daejeon (KR)

(73) Assignee: KOREA KUMHO PETROCHEMICAL CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/933,595

(22) Filed: Nov. 5, 2015

(65) Prior Publication Data
US 2016/0122480 A1 May 5, 2016

(30) Foreign Application Priority Data
Nov. 5, 2014 (KR) ........................ 10-2014-0152678

(51) Int. Cl.
| C08C 19/44 | (2006.01) |
| C08L 9/00 | (2006.01) |
| C08F 36/00 | (2006.01) |
| C08F 136/00 | (2006.01) |
| C08F 236/00 | (2006.01) |
| C08F 236/06 | (2006.01) |

(52) U.S. Cl.
CPC ................. *C08F 236/06* (2013.01)

(58) Field of Classification Search
None
See application file for complete search history.

(56) References Cited

U.S. PATENT DOCUMENTS 5,508,333 A  4/1996 Shimizu
2010/0152369 A1  6/2010 Shibata et al.

FOREIGN PATENT DOCUMENTS

KR  101310868 B1  10/2013
KR  101365902 B1  3/2014

OTHER PUBLICATIONS

Machine translation of Tonomura et al. JP 2011/121906 p. 1-12.*

* cited by examiner

*Primary Examiner* — Susannah Chung
*Assistant Examiner* — Robert T Butcher
(74) *Attorney, Agent, or Firm* — Saliwanchik, Lloyd & Eisenschenk

(57) ABSTRACT

One aspect of the present invention provides an end-modified conjugated diene polymer represented by Formula 1 below:

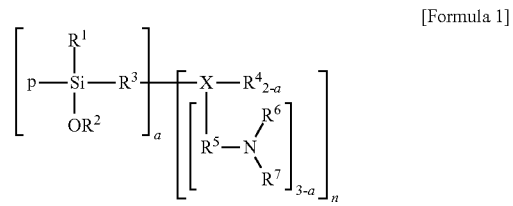

[Formula 1]

wherein p is a conjugated diene polymer chain; $R^1$ to $R^7$ are each independently $C_1$-$C_{20}$ saturated or unsaturated hydrocarbon chains; X is carbon (C), silicon (Si), or nitrogen (N); a is 1 or 2; and n is an integer of 1 to 200, and a method for preparing the same.

7 Claims, No Drawings

END-MODIFIED CONJUGATED DIENE POLYMER AND METHOD FOR PREPARING THE SAME

CROSS-REFERENCE TO RELATED APPLICATION

This application claims the benefit under 35 U.S.C. §119 of Korean Application No. 10-2014-0152678, filed Nov. 5, 2014, which is hereby incorporated by reference in its entirety.

BACKGROUND

Field of the Invention

The present invention relates to an end-modified conjugated diene polymer and a method for preparing the same.

Discussion of Related Art

Recently, as the interest in eco-friendly and energy-saving high functional tires rises, the research on the development of high functional rubbers with dynamic properties such as rolling resistance and wet resistance, mechanical properties, and machinability has been conducted in various ways.

In general, styrene-butadiene rubbers (hereinafter, 'SBR') or butadiene rubbers (hereinafter, 'BR') are used as rubbers for tires, and they are mainly manufactured by a solution polymerization method.

The solution polymerization method, which polymerizes a monomer among solvents using an organometallic compound as an initiator, to manufacture rubbers, is capable of adjusting a structure of monomer or polymer, a coupling rate, etc. The polymer manufactured according to said method has excellent rolling resistance and wet resistance, and thus said method is widely used for manufacturing rubbers for tires.

Additionally, according to the solution polymerization method, the cold flow at room temperature can be controlled by introducing a functional group into a part of polymer using a modifying agent, and machinability and dispersibility can be improved when combined with a reinforcing agent. Especially, dynamic properties of tires, such as wear resistance, rolling resistance, wet resistance, etc., may be improved by increasing compatibility with carbon black or silica, which is a reinforcing agent used, when combined in a rubber composition for tires.

According to U.S. Pat. No. 5,508,333, more excellent dynamic properties and mechanical properties may be acquired than the conventional rubber has by modifying molecular ends to alkoxysilane compounds including an epoxy group. However, it is difficult to control the coupling rate.

According to US Patent Publication No. 2010-0152369, the use of alkoxysilane compounds including primary amine substituted with hydrolysable protective groups as end modifying agents may reduce hysteresis of the tire manufactured therefrom. However, in this case, there is an economical limit resulting from the application of protective groups. Additionally, the cold flow is high, and accordingly, long-term storage stability may be reduced.

Thus, it is necessary to develop a conjugated diene polymer for tire rubber capable of increasing compatibility or miscibility with the reinforcing agents through end modification, and also improving mechanical and dynamic properties of the tire manufactured therefrom.

SUMMARY OF THE INVENTION

The present invention aims to solve the problems stated above. The purpose of the present invention is to provide an end-modified conjugated diene polymer capable of increasing compatibility or miscibility with reinforcing agents such as silica or carbon black, and improving mechanical and dynamic properties of tire, which is a final product, and a method for preparing the same.

In order to achieve the above purpose, one aspect of the present invention provides an end-modified conjugated diene polymer represented by Formula 1 below:

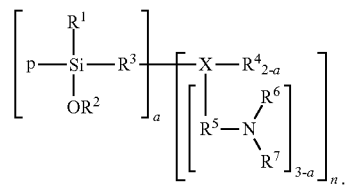

[Formula 1]

In the Formula 1, p is a conjugated diene polymer chain, $R^1$ to $R^7$ respectively are each $C_1$-$C_{20}$ saturated or unsaturated hydrocarbon chains; X is carbon (C), silicon (Si), or nitrogen (N); a is 1 or 2; and n is an integer of 1 to 200.

According to one embodiment of the present invention, the conjugated diene polymer chain may be a (homo)polymer chain including a conjugated diene monomer.

According to one embodiment of the present invention, the polymer chain may be a copolymer chain further including an aromatic vinyl monomer.

Additionally, another aspect of the present invention provides a rubber composition for tires, including the end-modified conjugated diene polymer.

According to one embodiment of the present invention, the composition has a Mooney viscosity of 40 to 150.

According to one embodiment of the present invention, the composition has a Mooney viscosity of 40 to 100.

According to one embodiment of the present invention, the composition has a Mooney viscosity of 80 to 100.

Additionally, yet another aspect of the present invention provides a method for preparing an end-modified conjugated diene polymer, which includes the steps of (a) polymerizing at least one monomer of a conjugated diene monomer and an aromatic vinyl monomer to form a living polymer in the presence of a solvent, a lewis base, and an organometallic compound; and (b) reacting the living polymer with a compound represented by Formula 2 below:

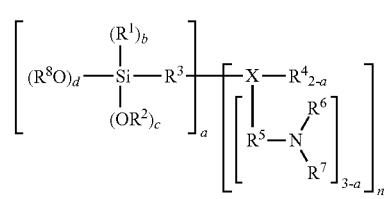

[Formula 2]

to modify an end of the living polymer.

In the Formula 2, $R^1$ to $R^8$ are each $C_1$-$C_{20}$ saturated or unsaturated hydrocarbon chains; X is carbon (C), silicon (Si), or nitrogen (N); a is 1 or 2; b, c and d are each integers of 0 to 3 satisfying an equation of b+c+d=3, and n is an integer of 1 to 200.

According to one embodiment of the present invention, the organometallic compound may be used in an amount of 0.01 mmol to 10 mmol with respect to 100 g of the monomer.

According to one embodiment of the present invention, the organometallic compound may be at least one selected from the group consisting of an organolithium compound, an organosodium compound, an organopotassium compound, an organorubidium compound, and an organocesium compound.

According to one embodiment of the present invention, a molar ratio of the organometallic compound and the compound represented by Formula 2 may be 1:0.5 to 1:3.0.

An end-modified conjugated diene polymer according to one aspect of the present invention allows at least one alkoxysilane group introduced between the ends of main chains or between main chains to easily control a coupling rate and cold flow, thereby improving long-term storage stability. Additionally, at least one nitrogen atom introduced together, that is, tertiary amine-based component, increases binding force between polymers and reinforcing agents when combined in rubber compositions, thereby improving dynamic properties such as wet resistance, rolling resistance, etc., and mechanical properties of the final product tires.

The present invention is not limited to the above-mentioned effects. Additionally, it should be understood that the present invention includes all effects which can be inferred from the constitutions described in the detailed description or the claims.

DETAILED DESCRIPTION OF EXEMPLARY EMBODIMENTS

Hereinafter, the present invention will be explained with reference to the accompanying drawings. The present invention, however, may be modified in various different ways, and should not be construed as limited to the embodiments set forth herein. Also, in order to clearly explain the present invention, portions that are not related to the explanation are omitted from the drawings, and like reference numerals are used to refer to like elements throughout.

Throughout the specification, it will be understood that when a portion "includes" an element, unless specifically described to the contrary, it should be understood that the portion does not exclude another element but may further include another element.

The embodiments of the present invention will be explained in detail with reference to the drawings attached.
An End-Modified Conjugated Diene Polymer One aspect of the present invention provides an end-modified conjugated diene polymer represented by Formula 1 below:

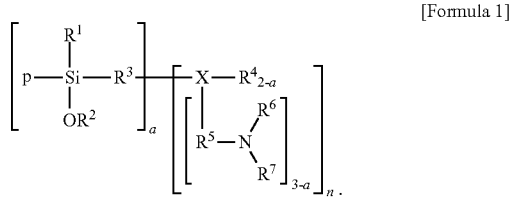

[Formula 1]

In the Formula 1, p is a conjugated diene polymer chain, $R^1$ to $R^7$ are each $C_1$-$C_{20}$ saturated or unsaturated hydrocarbon chains; X is carbon (C), silicon (Si), or nitrogen (N); a is 1 or 2; and n is an integer of 1 to 200.

Especially, when a is 1 in the Formula 1, since X has a $sp^a$ hybrid structure, and nitrogen atoms are respectively introduced to two branches extended from one X to form at least two tertiary amine groups, the conjugated diene polymer may be adjacent to silica by a hydrogen bond between silica, which is a reinforcing agent, and the amine group when combined in the rubber composition. At this time, a covalent bond may be formed between the alkoxysilane group of conjugated diene polymer and silica. The hydrogen bond and covalent bond reinforce a chemical bond between the conjugated diene polymer and silica, thereby improving dynamic properties, such as wet resistance, rolling resistance, etc., and mechanical properties required for tires.

Referring to the Formula 1, the polymer according to one aspect may be obtained by polymerizing a conjugated diene monomer alone, or modifying the end of a main chain where a conjugated diene monomer and an aromatic vinyl monomer are copolymerized by an alkoxysilane compound.

The conjugated diene monomer may be at least one selected from the group consisting of 1,3-butadiene, isoprene, 2,3-dimethyl-1,3-butadiene, 1,3-pentadiene, 1,3-hexadiene, 2,3-dimethylbutadiene, 2-phenyl-1,3-butadiene, 3-methyl-1,3-pentadiene, 2-chloro-1,3-butadiene, piperylene, 3-butyl-1,3-octadien, and octadien. Preferably, the conjugated diene monomer may be 1,3-butadiene, isoprene, or 2,3-dimethyl-1,3-butadiene, but is not limited thereto.

The aromatic vinyl monomer may be at least one selected from the group consisting of styrene, α-methylstyrene, 2-methylstyrene, 3-methylstyrene, 4-methylstyrene, 2,4-dimethylstyrene, 2,4-diisopropylstyrene, 4-propylstyrene, 4-cyclohexylstyrene, 4-(p-methylphenyl)styrene, 5-tert-butyl-2-methylstyrene, tert-butoxystyrene, 2-tert-butylstyrene, 3-tert-butylstyrene, 4-tert-butylstyrene, N,N-dimethylaminoethylstyrene, 1-vinyl-5-hexylnaphthalene, 1-vinylnaphthalene, divinylnaphthalene, divinylbenzene, trivinylbenzene, vinylbenzyldimethylamine, (4-vinylbenzene)dimethylaminoethylether, vinylpyridine, vinylxylene, vinyltoluene, diphenylethylene, diphenylethylene including tertiary amine, and styrene including primary, secondary, or tertiary amine. Preferably, the aromatic vinyl monomer may be styrene or α-methylstyrene, but is not limited thereto.

Additionally, when the conjugated diene polymer chain includes a conjugated diene monomer and an aromatic vinyl monomer, a weight ratio of the conjugated diene monomer to aromatic vinyl monomer may be 55% to 95% by weight: 5% to 45% by weight. When the content of aromatic vinyl monomer in the conjugated diene polymer chain is within the above range, a glass transition temperature (Tg) of copolymer increases. Thus, when applying to tires, physical properties, such as wet resistance, rolling resistance, or braking force, required for tires may be satisfied, and fuel efficiency may also be improved.

Additionally, another aspect of the present invention provides a rubber composition for tires including the end-modified conjugated diene polymer. The rubber composition for tires may further include reinforcing agents such as silica and carbonblack.

In general, in case of preparing a rubber composition for tires by combining a polymer with a reinforcing agent, the viscosity of the rubber composition increases while the combination of the polymer and the reinforcing agent progresses. The increase of viscosity may impede workability, storability and machinability of the rubber composition when manufacturing tires, so it is important to control the viscosity at a proper level. Specifically, when a Mooney viscosity of the rubber composition for tires exceeds 150, this may impede workability, storability and machinability. Thus, the Mooney viscosity of the rubber composition for tires may be adjusted in the range of 40 to 150, preferably in the range of 40 to 100, more preferably in the range of 80 to 100 by using the end-modified conjugated diene polymer.

A Method for Preparing an End-Modified Conjugated Diene Polymer

Another aspect of the present invention provides a method for preparing an end-modified conjugated diene polymer, which includes the steps of (a) polymerizing at least one monomer of a conjugated diene monomer and an aromatic vinyl monomer to form a living polymer in the presence of a solvent, a lewis base, and an organometallic compound; and (b) reacting the living polymer with a compound represented by Formula 2 below:

[Formula 2]

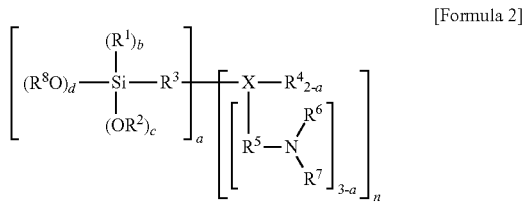

to modify an end of the living polymer.

In the Formula 2, $R^1$ to $R^8$ are each $C_1$-$C_{20}$ saturated or unsaturated hydrocarbon chains; X is carbon (C), silicon (Si), or nitrogen (N); a is 1 or 2; b, c and d are each integers of 0 to 3 satisfying an equation of b+c+d=3, and n is an integer of 1 to 200.

The step (a) forms a living polymer according to a general solution polymerization method. Specifically, the step (a) is performed in the presence of a solvent, a lewis base and an organometallic compound, and may use, as a monomer, a conjugated diene monomer alone, or a mixture of a conjugated diene monomer and an aromatic vinyl monomer.

The conjugated diene monomer may be at least one selected from the group consisting of 1,3-butadiene, isoprene, 2,3-dimethyl-1,3-butadiene, 1,3-pentadiene, 1,3-hexadiene, 2,3-dimethylbutadiene, 2-phenyl-1,3-butadiene, 3-methyl-1,3-pentadiene, 2-chloro-1,3-butadiene, piperylene, 3-butyl-1,3-octadien, and octadien. Preferably, the conjugated diene monomer may be 1,3-butadiene, isoprene, or 2,3-dimethyl-1,3-butadiene, but is not limited thereto. The aromatic vinyl monomer may be at least one selected from the group consisting of styrene, α-methylstyrene, 2-methylstyrene, 3-methylstyrene, 4-methylstyrene, 2,4-dimethylstyrene, 2,4-diisopropylstyrene, 4-propylstyrene, 4-cyclohexylstyrene, 4-(p-methylphenyl)styrene, 5-tert-butyl-2-methylstyrene, tert-butoxystyrene, 2-tert-butylstyrene, 3-tert-butylstyrene, 4-tert-butylstyrene, N,N-dimethylaminoethylstyrene, 1-vinyl-5-hexylnaphthalene, 1-vinylnaphthalene, divinylnaphthalene, divinylbenzene, trivinylbenzene, vinylbenzyldimethylamine, (4-vinylbenzene) dimethylaminoethylether, vinylpyridine, vinylxylene, vinyltoluene, diphenylethylene, diphenylethylene including tertiary amine, and styrene including primary, secondary, or tertiary amine. Preferably, the aromatic vinyl monomer may be styrene or α-methylstyrene, but is not limited thereto. Additionally, when the conjugated diene polymer chain includes a conjugated diene monomer and an aromatic vinyl monomer, a weight ratio of the conjugated diene monomer to the aromatic vinyl monomer may be 55% to 95% by weight:5% to 45% by weight.

A solvent available when polymerizing the solution may be one selected from the group consisting of aliphatic hydrocarbons, alicyclic hydrocarbons, aromatic hydrocarbons, and a combination of at least two thereof. Preferably, the solvent may be one selected from the group consisting of n-pentane, n-hexane, n-heptane, isooctane, cyclohexane, toluene, benzene, xylene, and a combination of at least two thereof, and more preferably, may be cyclohexane, but is not limited thereto. The monomers may be included in an amount of 5% to 40% by weight, preferably, 10% to 25% by weight in the solvent. When the content of monomer in the solvent is less than 5% by weight, a great deal of solvent may be used, and accordingly, manufacturing yield may be reduced and production cost may be increased. When the content of monomer exceeds 40% by weight, it may be difficult to control viscosity and heat of reaction of the polymerization solution.

The lewis base, which is a material used to control a microstructure of a polymer, may be one selected from the group consisting of tetrahydrofuran, di-n-propyl ether, diisopropylether, diethylether, diethyleneglycol dimethyl ether, di-n-butyl ether, ethyl butyl ether, triethylene glycol, 1,2-dimethoxybenzene, ditetrahydrofurylpropane, ditetrahydrofurfurylpropane, ethyltetrahydrofurfuryl ether, trimethylamine, triethylamine, N,N,N,N-tetramethylethylenediamine, and a combination of at least two thereof. Preferably, the lewis base may be ethyltetrahydrofurfuryl ether, tetrahydrofuran, ditetrahydrofurfurylpropane, ditetrahydrofurylpropane, or N,N,N,N-tetramethylethylenediamine, but is not limited thereto. The amount of the lewis base to be introduced may be adjusted according to the number of mol in a total of anions, and the content of vinyl in the target conjugated diene compound at an initial temperature condition.

The organometallic compound serving as a polymerization initiator in the step (a) may be at least one selected from the group consisting of an organolithium compound, an organosodium compound, an organopotassium compound, an organorubidium compound, and an organocesium compound, preferably, may be an organolithium compound, and more preferably, may be an alkyl lithium compound having an alkyl group with 1-20 carbon atoms. The alkyl lithium compound available may be one selected from the group consisting of methyllithium, ethyllithium, isopropyllithium, n-butyllithium, sec-butyllithium, tert-butyllithium, and a combination of at least two thereof, and preferably, may be n-butyllithium or sec-butyllithium, but is not limited thereto. The usage of the organometallic compound may vary depending on a target molecular weight of a polymer generated, but generally, 0.01 mmol to 10 mmol, preferably, 0.1 mmol to 3.0 mmol of organometallic compound may be used with respect to 100 g of a monomer.

The onset temperature of polymerization during solution polymerization in the step (a) may be about 10° C. to 100° C., preferably, about 20° C. to 90° C. When the onset temperature is less than 10° C., the viscosity of the solution rapidly increases as the reaction proceeds, and accordingly, the reaction rate may be decreased, which is disadvantageous economically. When the onset temperature exceeds 100° C., it may be difficult to control the reaction temperature. Additionally, the reaction pressure may be 0.5 kgf/cm² to 10 kgf/cm². In general, the polymerization may be performed for a sufficient time until all of the monomers are converted into copolymers, that is, for 20 to 200 minutes until a target conversion rate is achieved.

Secondly, the step (b) reacts the living polymer formed in the step (a) with the alkoxysilane compound represented by the Formula 2 to modify the end of the living polymer.

The alkoxysilane compound represented by the Formula 2 may be manufactured with a route of Scheme 1 or 2 below depending on the type of atom X. In the Scheme 1 or 2 below, $R^1$ to $R^8$ are each $C_1$-$C_{20}$ saturated or unsaturated hydrocarbon chains; X is carbon (C), silicon (Si), or nitrogen (N); L is an optional leaving group; a is 1 or 2; b, c and d are each integers of 0 to 3 satisfying an equation of b+c+d=3; and n is an integer of 1 to 200.

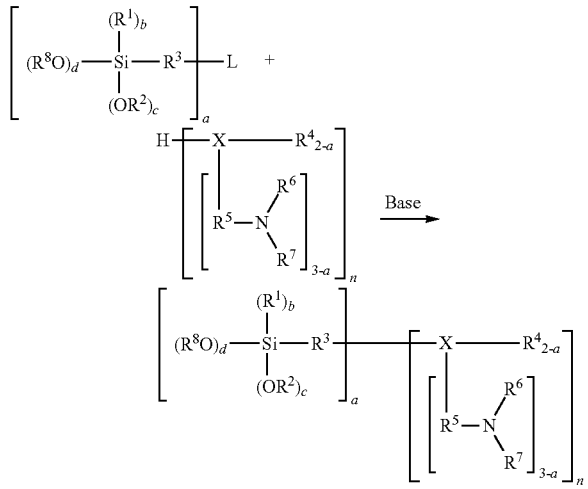

[Scheme 1]

First of all, when the atom X is nitrogen, the alkoxysilane compound according to one embodiment may be manufactured by nucleophilic substitution represented by the Scheme 1 above in the presence of a base. At this time, the reaction temperature may be adjusted in the range of −30° C. to 150° C. As the base, hydride, hydroxide, carbonate, or bicarbonate of alkali metal or alkali earth metal may be used, and specifically, sodium hydride (NaH) or sodium hydroxide (NaOH) may be used. As the reaction solvent, polar organic solvents capable of increasing solubility of a reactant, for example, dimethylformaldehyde may be used.

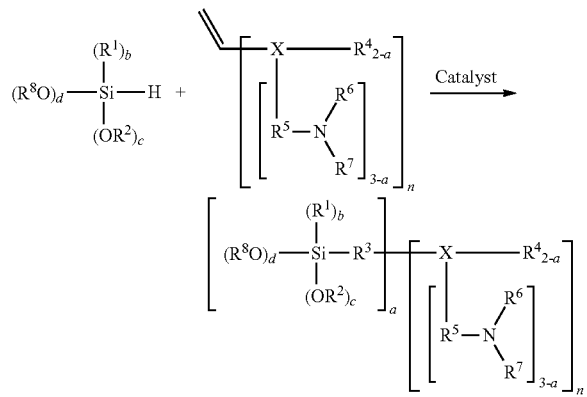

[Scheme 2]

Additionally, when the atom X is carbon or silicon and thus cannot act as a nucleophilic agent, that is, nucleophilic substitution cannot be performed, an alkoxysilane compound according to one embodiment may be manufactured by a hydrosilylation reaction represented by the Scheme 2 in the presence of platinum (Pt). At this time, the reaction temperature may be a reflux temperature, and this may vary depending on the type of reaction solvent used. However, the reaction temperature may be adjusted in the range of about 100° C. to 180° C. The type of reaction solvent is not particularly limited, but it is preferable to use aromatic solvents such as benzene and toluene.

Meanwhile, the alkoxysilane compound represented by the Formula 2 may be used in the range of 0.5 mol to 3.0 mol per 1 mol of the organometallic compound. When a relative usage for 1 mol of the organometallic compound is less than 0.5 mol, an effect of modifying an end of the living polymer may be slight. When the relative usage exceeds 3.0 mol, a great deal of modifying agents are used, and accordingly, manufacturing yield may be reduced and production cost may be increased.

Additionally, while modifying the end in the step (b), the reaction temperature may be between 30° C. and 200° C., preferably, between 50° C. and 110° C. When the reaction temperature is less than 30° C., the viscosity of the solution increases as the reaction proceeds, and thus the reaction rate may be decreased. When the reaction temperature exceeds 200° C., the living polymer performs a coupling reaction by itself, and thus an effect of modifying the end by the alkoxysilane compound may be slight.

Hereinafter, the present invention will be explained in detail with reference to the embodiments. Meanwhile, the embodiments are for the illustrative purposes only, and the contents of the present invention are not limited thereto.

Example 1

22 g of styrene, 369 g of 1,3-butadiene, 2,200 g of normal heptane, and 5 mL of ethyltetrahydrofurfuryl ether were put into a 5 L reactor, and while stirring, a temperature inside the reactor was adjusted to 35° C. When the temperature inside the reactor reaches 35° C., 1.7 mmol of n-butyllithium, which is a polymerization initiator, was added and adiabatic temperature-rising polymerization was performed. At this time, progression of the polymerization was observed through the change in reaction temperature. Additionally, the rate of monomer and the conversion rate of reaction were analyzed by sampling a small quantity of reactants between the reactions.

When the polymer conversion rate of the monomer reaches 99%, additional 9 g of 1,3-butadiene was added to substitute the reaction end with butadiene. Afterwards, 2.7 mmol of $N^1$,$N^1$-diethyl-$N^2$,$N^2$-bis(3-(trimethoxysilyl)propyl)ethane-1,2-diamine, which is an end modifying agent, was added to the reactor and left for a certain time, and then 4 g of butylated hydroxy toluene (BHT), which is an antioxidant, was added to terminate the reaction. After that, stripping and roll-drying were performed to remove the residual solvent and water, and a polymer was obtained.

Example 2

A polymer was obtained in the same manner as Example 1 above, except that 2.7 mmol of 6-(2-(dimethylamino)ethyl)-$N^1$,$N^1$,$N^{10}$,$N^{10}$-tetramethyl-3-(3-trimethoxysilyl)propyl)decane-1,10-diamine was added as an end modifying agent.

Comparative Example 1

A polymer was obtained in the same manner as Example 1 above, except that an end modifying agent was not added.

Comparative Example 2

A polymer was obtained in the same manner as the Example 1 above, except that 2.7 mmol of N,N-dimethylaminopropyltrimethoxysilane was added as an end modifying agent.

Table 1 below shows properties of end-modified copolymers manufactured in the Examples 1 and 2, and in Comparative Examples 1 and 2. In the Table 1 below, the end modification rate, styrene content, and vinyl content are mol % values calculated by using NMR analysis result values, and weight-average molecular weight was measured through gel permeation chromatography (GPC).

TABLE 1

| | End modification rate (mol %) | Weight-average molecular weight (Mw) | Mooney viscosity (ML$_{1+4}$, 100° C.) | Styrene content (mol %) | Vinyl content in BD unit (mol %) |
|---|---|---|---|---|---|
| Example 1 | 58 | 546,000 | 73 | 10.1 | 39.8 |
| Example 2 | 42 | 512,000 | 70 | 10.0 | 39.7 |
| Comparative Example 1 | 0 | 215,000 | 41 | 9.9 | 39.8 |
| Comparative Example 2 | 29 | 490,000 | 72 | 10.0 | 40.0 |

Experimental Example: Evaluation on Properties of Rubber Composition for Tire

Each copolymer manufactured according to Examples 1 and 2, and Comparative Examples 1 and 2 above was combined with silica in a 500 cc lab mixer according to conditions shown in Table 2 below to manufacture a rubber composition for tires.

TABLE 2

| Components of composition | Content (phr) |
|---|---|
| Solution SBR | 80 |
| High cis BR | 20 |
| Stearic acid | 2 |
| ZnO$_2$ | 3 |
| Silica | 80 |
| Aromatic oil | 10 |
| Si-69 | 6.4 |
| CZ | 1 |
| DPG | 1.5 |
| sulfur | 1.5 |

Solution SBR: Copolymer obtained in Examples 1 and 2, and Comparative Examples 1 and 2
High cis BR: KBR01 (Kumho Petrochemical Co., Ltd.)
Si-69: bis-(triethoxysilylpropyl)tetra-surfide
CZ: N-cyclohexylbenzothiazyl sulfonamide
DPG: 1,3-diphenylguanidine Machinability of the rubber compositions and properties thereof after combination were measured and compared, and the result thereof is shown in Table 3 below. The method for measuring the properties is as below.

Hardness: Measured by using a SHORE-A hardness tester

Tensile strength, 300% modulus and elongation percentage: Measured by using a universal test machine (UTM) based on ASTM 3189 Method B.

Tan δ, which is a dynamic property value of vulcanized rubber: Analyzed in a modification condition of frequency 10 Hz, 0.2 by using Rheometic's DTMA 5 equipment.

TABLE 3

| Properties | Evaluation Item | Example 1 | Example 2 | Comparative Example 1 | Comparative Example 2 |
|---|---|---|---|---|---|
| Mechanical properties | Hardness (SHORE-A) | 71 | 70 | 65 | 69 |
| | Tensile strength (kgf/cm$^2$) | 172 | 161 | 121 | 160 |
| | 300% modulus (kgf/cm$^2$) | 168 | 151 | — | 149 |
| | Elongation percentage (%) | 373 | 364 | 260 | 360 |
| | Bound rubber (wt %) | 56 | 51 | 17 | 31 |
| Dynamic properties | Tg (° C.) | −48.8 | −48.0 | −48.0 | −48.1 |
| | Tanδ at 0° C. (wet resistance) | 0.2195 | 0.1914 | 0.1103 | 0.1354 |
| | Tanδ at 60° C. (rolling resistance) | 0.0781 | 0.0810 | 0.10018 | 0.0991 |
| Machinability/Storability | Mooney viscosity | 84 | 92 | 149 | 105 |
| | Cold flow (mg/min) | 0.91 | 0.94 | 2.1 | 1.9 |

Referring to Table 3 above, first of all, the rubber composition where the copolymers of Examples 1 and 2 are combined has a lower Mooney viscosity and cold flow than the copolymers of Comparative Examples 1 and 2. Thus, it can be known that machinability and storage stability are improved. Especially, the rubber compositions of Examples 1 and 2 have low cold flow, so they may maintain their original package shape when packaging a certain standard, regardless of the weight, pressure and time. Thus, the rubber compositions in Examples 1 and 2 may be advantageous for consumers producing and manufacturing other products using the composition.

Additionally, it was confirmed that the hardness, tensile strength, 300% modulus and elongation percentage of the rubber compositions in which the copolymers of Examples 1 and 2 are combined are partially improved compared to those of Comparative Examples 1 and 2. Especially, the content of bound rubber in the rubber compositions increases by about 70% to 200%, and thereby binding force between the copolymer and silica is greatly reinforced.

Furthermore, when comparing tan δ values at 0° C. and 60° C. between the Examples and Comparative Examples, the rubber compositions where the copolymers of Examples 1 and 2 are combined have high wet resistance (0° C.) and lower rolling resistance (60° C.). Thus, it can be understood that the tire to which the rubber compositions of Examples 1 and 2 apply has improved stability and fuel efficiency.

Although the forgoing description of the present invention has been disclosed for illustrative purposes, those skilled in the art will appreciate that various modifications, additions and substitutions are possible, without departing from the scope and spirit of the present invention as disclosed in the accompanying claims. Therefore, it should be understood that the embodiments described above are by way of example only, and are not intended to limit the present invention. For example, each constituent explained in singular form may be carried out being dispersed, and likewise, constituents explained as being dispersed may be carried out in combined forms.

The scope of the present invention is defined by the following claims, and it should be construed that the present invention covers the modifications or variations of the present invention provided they come within the scope of the appended claims and their equivalents.

What is claimed is:

1. An end-modified conjugated diene polymer represented by Formula 1 below:

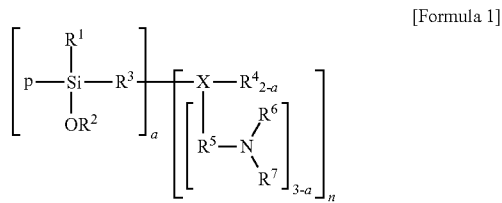

[Formula 1]

wherein p is a conjugated diene polymer chain; $R^1$ to $R^7$ are each $C_1$-$C_{20}$ saturated or unsaturated hydrocarbon chains; X is carbon (C), silicon (Si), or nitrogen (N); a is 1; and n is an integer of 1 to 200.

2. The end-modified conjugated diene polymer of claim 1, wherein the conjugated diene polymer chain is a polymer chain including a conjugated diene monomer.

3. The end-modified conjugated diene copolymer of claim 2, wherein the polymer chain is a copolymer chain further including an aromatic vinyl monomer.

4. A rubber composition for tires, comprising the end-modified conjugated diene polymer according to claim 1.

5. The rubber composition for tires of claim 4, wherein the composition has a Mooney viscosity of 40 to 150.

6. The rubber composition for tires of claim 5, wherein the composition has a Mooney viscosity of 40 to 100.

7. The rubber composition for tires of claim 6, wherein the composition has a Mooney viscosity of 80 to 100.

\* \* \* \* \*